(12) United States Patent
Baumann et al.

(10) Patent No.: US 7,082,408 B1
(45) Date of Patent: Jul. 25, 2006

(54) SYSTEM AND METHOD FOR ORDERING ITEMS USING A ELECTRONIC CATALOG VIA THE INTERNET

(75) Inventors: Carl S. Baumann, Vestal, NY (US); Susan B. Cirulli, Edicott, NY (US); Michael R. May, Johnson City, NY (US); Glenn P. Modrak, Conklin, NY (US); Amy J. Snavely, Binghamton, NY (US); Brian E. Taylor, Newark, CA (US); Sherry L. Wilson, Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 09/450,595

(22) Filed: Nov. 30, 1999

(51) Int. Cl.
*G06F 17/60* (2006.01)

(52) U.S. Cl. .......................... 705/26; 700/96; 700/236; 700/266; 705/1; 705/10; 705/27; 705/28; 705/34; 705/40; 705/400

(58) Field of Classification Search ................. 705/26, 705/27
See application file for complete search history.

(56) References Cited

U.S. PATENT DOCUMENTS

| 5,319,542 A | 6/1994 | King, Jr. et al. |
| 5,515,268 A | 5/1996 | Yoda |
| 5,544,040 A | 8/1996 | Gerbaulet |
| 5,758,327 A | 5/1998 | Gardner et al. |
| 5,878,141 A | 3/1999 | Daly et al. |
| 5,963,915 A | 10/1999 | Kirsch |
| 5,970,475 A * | 10/1999 | Barnes et al. ................. 705/27 |

* cited by examiner

*Primary Examiner*—Wynn W. Coggins
*Assistant Examiner*—Jaime E. Zurita
(74) *Attorney, Agent, or Firm*—Scully, Scott, Murphy & Presser, P.C.; William E. Schiesser

(57) ABSTRACT

A system and method for procuring non-production commodities for use by employees of a commercial enterprise includes associating the employee with a user profile comprising information relating a status of the employee within the enterprise, automatically generating a requisition for the employee indicating a desired commodity and quantity thereof, and, utilizing the user profile information and the desired commodity to enable employee searching of specific catalogs provided in a database storage device for indication of the desired commodity in a requisition. The system and method further provides for the automatic generation of a purchase order based on the requisition, the forwarding of the purchase order to the vendor for processing the order without a third party intervenor, and provides a mechanism for receiving vendor purchase order acknowledgments and approving vendor initiated changes to the purchase order without third party intervention.

26 Claims, 10 Drawing Sheets

SYSTEM AND METHOD FOR ORDERING ITEMS USING A ELECTRONIC CATALOG VIA THE INTERNET

BACKGROUND OF THE INVENTION

1. Field of the Invention

The present invention relates to systems and methods for facilitating the ordering of items from suppliers, and particularly, to novel enhancements for a production part and non-production part procurement system.

2. Discussion of the Prior Art

Commonly-owned U.S. Pat. No. 5,319,542 entitled SYSTEM FOR ORDERING ITEMS USING AN ELECTRONIC CATALOGUE describes an electronic catalog ordering process and system for procuring commercial parts and services. The system comprises two main components: 1) an electronic catalog which permits on-line access to supplier's catalogs of products and services; and 2) an electronic requisition system which automates the hardcopy requisition and its approval process. The system described is interactive and cooperative use of these two system components enables a requestor to complete a purchase request during one system session.

Generally, according to the system described in U.S. Pat. No. 5,319,542 and shown in FIG. 1, the electronic catalog component 100 includes: a supplier master catalog 108 which is a separate catalog separately owned and maintained by the supplier for the purposes of building, storing and maintaining his/her catalog; a public catalog 106 which is loaded with the entire supplier catalog or select catalog items for access by multiple customers, e.g., via a public database 104; and a private catalog 110 which is a special catalog separately owned by the customer and typically resident on the customers local host computer system.

The Electronics Requisition Process is an automated form (not shown) residing on a computer system which is used to initiate the procurement process, and is intended for use by four primary groups, each of which has specific responsibilities with regard to the ordering process and completion of the requisition. The four primary groups include:

1) The Requestor—is the party who defines the need for a purchased item and has the responsibility for creating the purchase requisition. Through an application program (not shown), the Requestor initiates the requisition by accessing the Public or Private Catalog to search for the item of interest. If the item is found, the system will prefill the required fields of the requisition. Otherwise, if the item is not in the Catalogs, the required data is manually entered. The requisition is then routed to the Approver who is the party that will either reject the requisition, and bounce it back to the Requestor, or approve it. If approved, the requisition will be routed to the company's procurement system for items ordered from the catalogs or manually entered items. Typically, the requisition goes to the Buyer for completion of the requisition and approval of the Supplier.

2) The Buyer—is the party in most companies who has been identified as the authorized agent to make purchases. The Buyer typically has responsibility for selecting where products may be purchased, as well as establishing an acceptable price that will be paid. In the electronic processing environment, the Buyer may receive an individual purchase requisition from a Requestor once it has been routed through the approval process. The Buyer may access the Public or the Private Catalog as deemed necessary to perform the normal buying task. When items are selected from the Catalog, the requisition is prefilled with required data and only minimal additional data will be needed. If a non-catalog item is to be purchased, the Buyer will keyboard in the required data to complete the transaction. Once the requisition has been approved, it will then be processed through the company's procurement system and a Purchase Order will be electronically sent to the Supplier.

3) The Approver—is the party that has the authority to validate the need for purchase, that funding exists, etc. This individual will be identified by the company, and system tables will autocratically route requisitions as they are processed by the Requestor.

4) The Application Administrator—is the party assigned over-all responsibility for the maintenance and control of the electronic requisition process. There may be more than one area responsible for different portions of the system. For example, a database administrator may control the routing/approval process in all associated tables. A Procurement Administrator may typically control those areas that relate to the requisition requirements.

It is understood that all user groups will need access to terminals for personal computer workstations to access the mainframe application.

It is the case that the current procurement system described in U.S. Pat. No. 5,319,542 is limited in the respect that there is always required the approval process step irregardless of the item/product being requested for purchase, thus requiring an extra process step which increases production cycle time, and hence, increase cost of a production process. It is further limited in the respect that the prior art automated procurement process for production parts requires active buyer intervention, again, contributing to the increase in production cycle time. Moreover, the procurement process for product/items contemplated according to the prior art system relates to production parts only, i.e., parts having associated production part numbers.

It would thus be highly desirable to provide for an automated procurement system a mechanism that permits greater customer control by eliminating buyer (third-party) intervention, and bases control on the item/part being purchased, and the manner in which it is being purchased, e.g., by contract or catalog. This enhancement wold bypass the step of obtaining management approval or buyer needed if certain criteria is met which would greatly enhance the automated buying process and shorten the purchasing cycle.

It would additionally be highly desirable to provide for an automated procurement system a mechanism that enables purchasing of products/items absent production part numbers. Such a mechanism would permit purchasing of small quantities of vendor parts for new product development areas for which no new part numbers have been assigned, thus shortening the purchasing cycle.

SUMMARY OF THE INVENTION

It is another object of the present invention to provide a mechanism for an automated procurement system that enables customers to purchase production and non-production items, over the Web, without buyer intervention.

It is another object of the present invention to provide a mechanism for a web-based automated procurement system that enables purchases of production and non-production items without buyer intervention, and particularly, evaluates requisitions, create purchase orders, and processes requester alterations and vendor acknowledgments without buyer intervention.

It is a further object of the present invention to provide a mechanism for an automated procurement system that permits greater customer control of on-line purchases by basing control on the item/part being purchased and, on the manner in which the product/item is being purchased.

It is another object of the present invention to provide a mechanism for an automated procurement system that enables the purchase of non-production parts, i.e., products/items having no assigned production part number, such as, for example, small quantities of vendor products/items during new product development.

Thus, according to the invention there is provided a system and method for procuring non-production commodities for use by employees of a commercial enterprise including: associating the employee with a user profile comprising information relating a status of the employee within the enterprise, automatically generating a requisition for the employee indicating a desired commodity and quantity thereof, and, utilizing the user profile information and the desired commodity to enable employee searching of specific catalogs provided in a database storage device for indication of the desired commodity in a requisition form. The method further includes the automatic generation of a purchase order based on the requisition, and, the forwarding of the purchase order to the vendor for processing the order without third party intervention.

Advantageously, the system and method of the invention enables electronic forwarding of the purchase order to the vendor for approval thereof and provides a mechanism for receiving vendor purchase order acknowledgments and approving vendor initiated changes to the purchase order without third party intervention.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
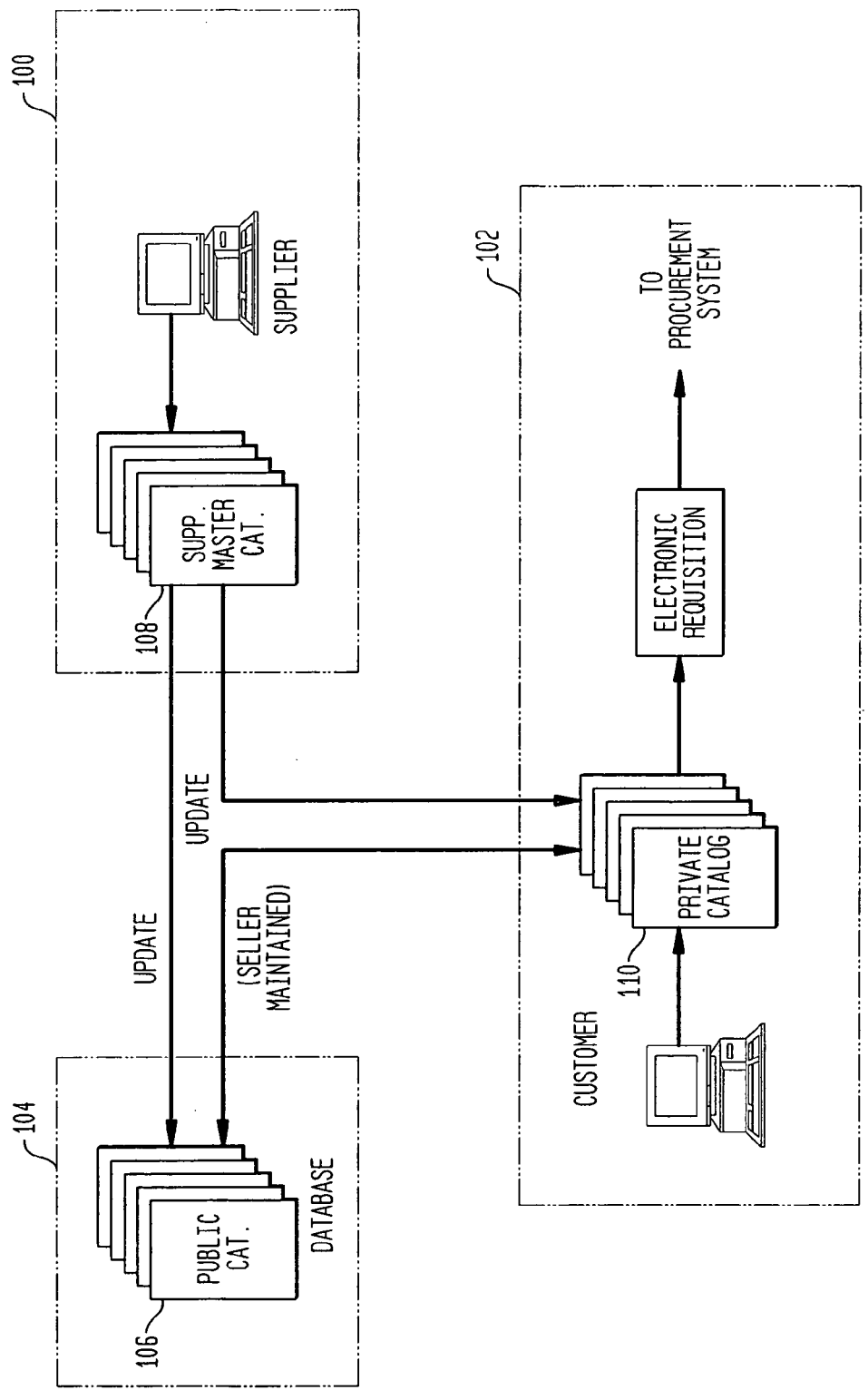
FIG. 1 illustrates a prior art electronic catalog automated purchasing system.
Figure 2:
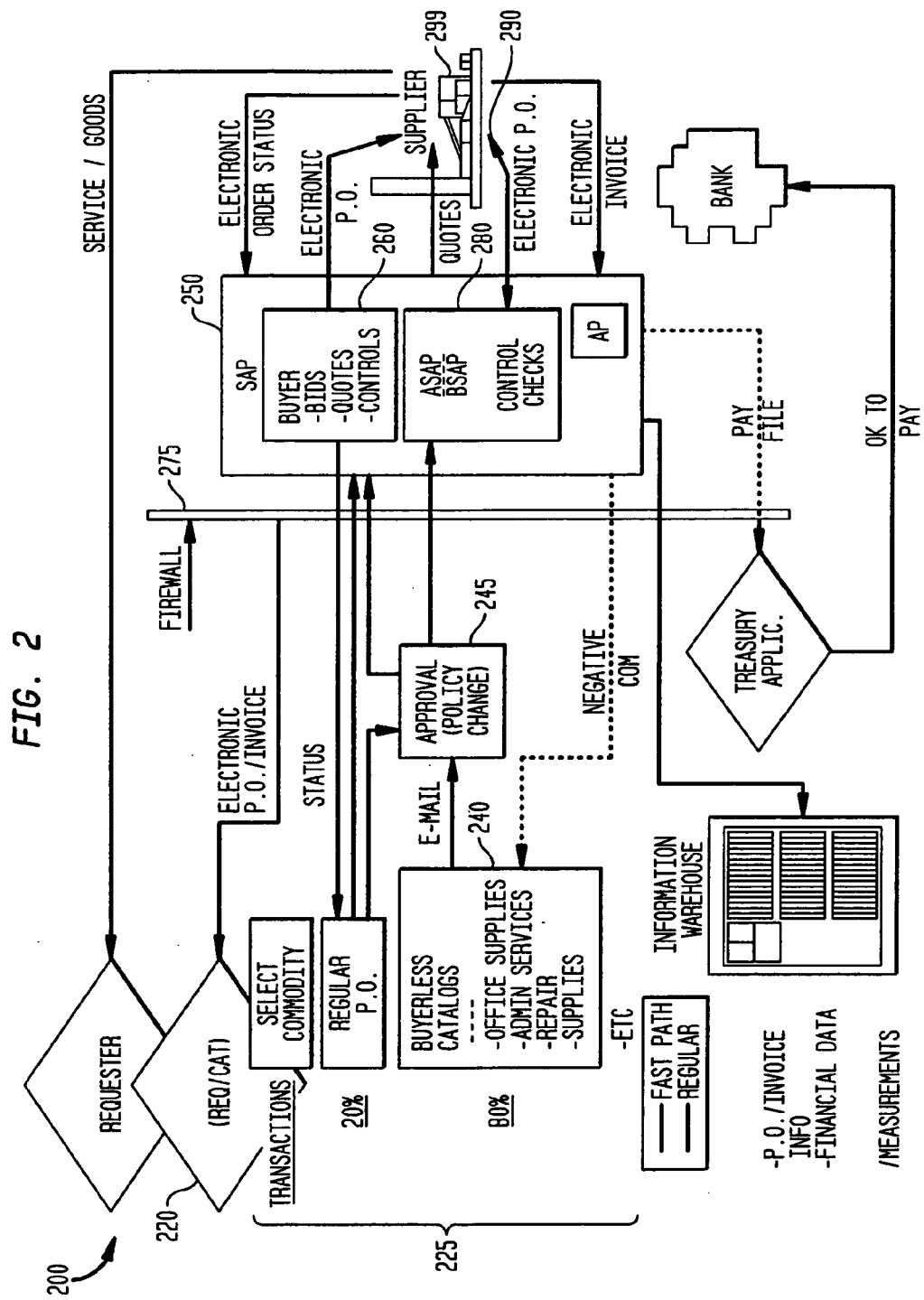
FIG. 2 illustrates the world-wide procurement system implementing the buyerless Requisition and catalog purchasing enhancements of the invention.

FIG. 2 depicts a world wide procurement system 200 including a System Applications Product ("SAP") processing engine 250 which is the existing purchasing engine used to electronically receive product requests—Requisitions—and automatically generate Purchase Orders (POs) for electronic delivery to a supplier/vendor 299 of the requested product. As shown in FIG. 2, a variety of internal/external systems interface with the SAP purchasing engine 250. One system includes a browser enabled computing system 220, running a global procurement application 225, hereinafter referred to as "Req/Cat" which is a web-based system that enables users/customers to generate on-line, general procurement Requisitions for input to the SAP beyond a firewall 275. Particularly, customers may search through supplier Catalogs 240 to select items and fill in order information. Submitted requisitions may be routed through an approval process 245 using FormWave™ which is a commercially available product of International Business Machines, Inc., the assignee of the present invention, to ensure that the requisition meets certain pre-determined criteria. It should be understood that, requisitions for certain products may be considered "pre-approved", for example, when the total purchase amount for these products is within a certain pre-determined dollar amount range. Alternately, requisitions may be "approved" by the Req/Cat process itself by an internally configured process. Requisitions that have been approved or "pre-approved" are then sent to the back-end (SAP) processing system 250, where a purchase order (PO) is cut and billing occurs. The global procurement application 225 additionally enables customers to monitor their requisition status, as the back end SAP system sends status updates to the application. Particularly, according to the invention, the global procurement application 225 includes Buyerless Calalogs 240 which provides the information enabling selection/purchasing of non-production goods, e.g., office supplies, repair, administrative services, etc. having no associated production part number. Furthermore, as will be described, the system 200 enables purchases of these types of parts without Buyer intervention.

As further shown in FIG. 2, there is depicted two process enhancements 280 to the SAP: an Automated SAP ("ASAP") which is a process that enables automatic purchasing from a catalog while bypassing a buyer completely, and evaluating requisitions, which, once approved, go directly to a supplier; and, a Blanket SAP ("BSAP") which is a process for enabling blanket purchases by enabling releases from established contracts without buyer intervention. Both processes automate the buying process and shorten the purchasing cycle thereby decreasing costs by eliminating buyer involvement. More particularly, as will be explained in greater detail herein, the function of the ASAP process is to define a common process utilizing the World Wide Procurement SAP instance that will evaluate requisitions, create purchase orders, process requestor alterations and vendor acknowledgments without buyer intervention, i.e., to facilitate the procurement of generally low dollar goods and services without a buyer's active participation. The buyer has a passive participation in configuring the application to act in his behalf. The business objective of the BSAP process is to define a common process utilizing the World Wide Procurement SAP instance that will evaluate requisitions and create the initial purchase order without buyer intervention.

With more particularity, the Req/Cat is a Web-based application for efficiently preparing, tracking and managing all of a customer's electronic purchase requisitions—from the point of origin through approval, receipt, and payment. It is the front end for purchasing non-production goods and services.

The Req/Cat Web application particularly supports the following specific "user" roles: 1) Requestors—who originate their own requisitions; 2) Initiators—who originate requisitions for other users; 3) Approvers—who review requisitions for approval/rejection; and, 4) Administrators—who manage the Req/Cat Web for a particular Country/Company.

Figures 3, 4:
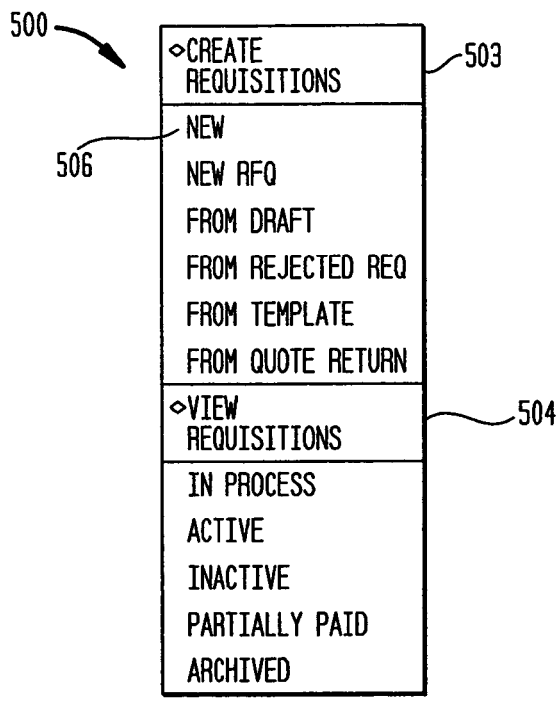
FIG. 3 illustrates a web-based communication including the Requisition/Catalog application navigation menu employed in the system of the present invention.
FIG. 4 illustrates a web-based communication displaying a Requisition content frame.

To initiate the Req/Cat Web application, a "user" first logs on to the Req/Cat Web site via a logon dialog box GUI display. Once logged on, the user enters a user ID in the User Name entry field and an HTTP password in a password entry field. In response, the user is presented with a main navigation menu 500, such as depicted in FIG. 3, which enables the following actions: 1) Create Requisitions 503—for enabling Requestors and Initiators to generate requisitions; and, 2) View Requisitions 504—for enabling Requestors and Initiators to view status of existing requisitions. Although not shown, via the navigation menu 500, Approvers will be enabled to review assigned requisitions; Administrators will be able to perform general application administration, review all outstanding invoice confirmations, and, manage the Catalogs that configure the Req/Cat Web application. Further, via the navigation menu 500, any Req/Cat Web user will be able to review his/her own User Profile. As shown in FIG. 3, when the user clicks on one of the first five buttons at the top of the navigation menu, sub-menus are displayed. The highlighted button shown in FIG. 3 indicates the selected topic, e.g., Create Requisitions 503. Additionally, a Create Requisitions sub-menu button, e.g., New 506 is also indicated as being selected.

According to the invention, the manner in which New Requisitions are created is as follows: First, it is determined whether the user is a first time user. If the user is a first time user, he/she will be prompted to create a user profile including all of the mandatory user profile information such as the user's serial number, country, company, plant and dept number. If the user is already identified in the system, the user is associated with his/her user profile, and depending on the User Profile, is presented with the web-page screen shown in FIG. 4. Particularly, the web-page screen shown in FIG. 4 includes a Requisition content frame 550 including new Requisition Summary information 560 associated with the particulars for generating a new Requisition; a Requestor Summary information 570 associated with the User Profile of the Requestor/Initiator; and, a Requisition Items frame enabling selection of the requested commodity. Particularly, the Requisition Summary information 560 includes the following fields: a Requisition ID field 562; a Requisition Status field 564; a Requisition date field 566; a total price field 561; and, an internal/external indication 568 indicating whether the requested items are for internal consumption (i.e., within the enterprise) or, are to be resold to an external customer. A button 569 is provided for designating the requested commodities to be purchased as being for internal use, or, for re-sale to another party. According to the invention, this indication will dictate the type of searching that a user is enabled to perform. The Requestor Summary information 570 includes the following fields: a Requestor name field 572; an Initiator name field 574; a Country field 575; a Company field 576; a Plant field 577; and a Department field 578. As shown in FIG. 4, the Requisition Items frame includes a "Shop for items" button 580, which, when selected, initiates presentation of a "Shop For Items" screen 590 (FIG. 5) that enables the user to choose a particular shopping method. According to the Req/Cat Web application of the invention, the combination of the user profile including the serial number, country, company, plant and dept number, along with the particular item requested and whether it is purchased for internal or external (customer) use, will automatically steer the user to the proper catalogs/screens to fill out for ordering. In the preferred embodiment, a link between a user and the catalogs that the user has access to is established via the use of commodity codes. Particularly, each item in a catalog has an associated commodity code and a user is linked to the commodity codes he/she can use, based on his/her user profile (e.g., the company and plant combination).

Figure 5:
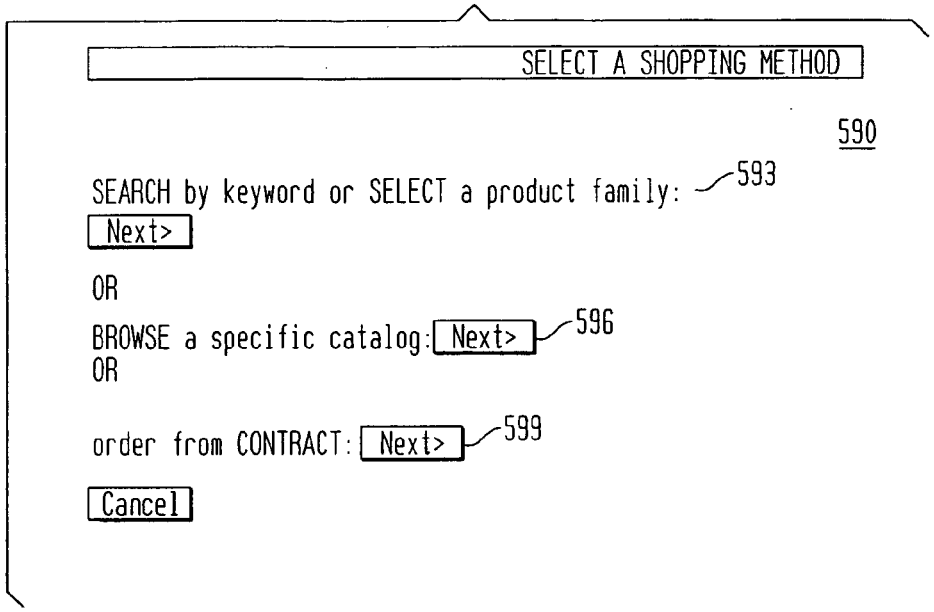
FIG. 5 illustrates a web-based communication presenting a Shop For Items screen for enabling user selection of a shopping method.

As shown in FIG. 5, for example, the Shop For Items screen 590 enables selection of one of the following shopping methods: 1) a Search by Keyword (Search) or a Selection of a Product Family (Select) and collectively referred to herein as "Search/Select" 593; 2) Browsing a catalog (Net Commerce or (Open Buying on the Internet "OBI") 596; or, 3) order from a Contract (blanket order) 599. Depending on the shopping method selection and the results of the keyword search or product family selection, there are four purchase types: Catalog Purchase; Full Buyer Purchase; Preferred Supplier Purchase; and, Preferred Supplier Item. The Catalog Purchase is enabled if the user selects by Keyword and the keyword is associated with a catalog. Additionally, a Catalog Purchase is enabled if the user select a Product Family and the commodity selected is associated with a catalog. Furthermore, a user may Browse a specific Catalog directly. The Full Buyer Purchase is enabled when either of the first two shopping methods and the commodity is classified as a Full Buyer Item. The Preferred Supplier Purchase is enabled when the user selects either of the first two shopping methods and the commodity is classified as a Preferred Supplier Item. The Preferred supplier type of purchase is similar to the Full Buyer Item type of purchase except that the supplier is provided by the application. The Contract Purchase is enabled when the user selects the Contract shopping method.

Figure 6:
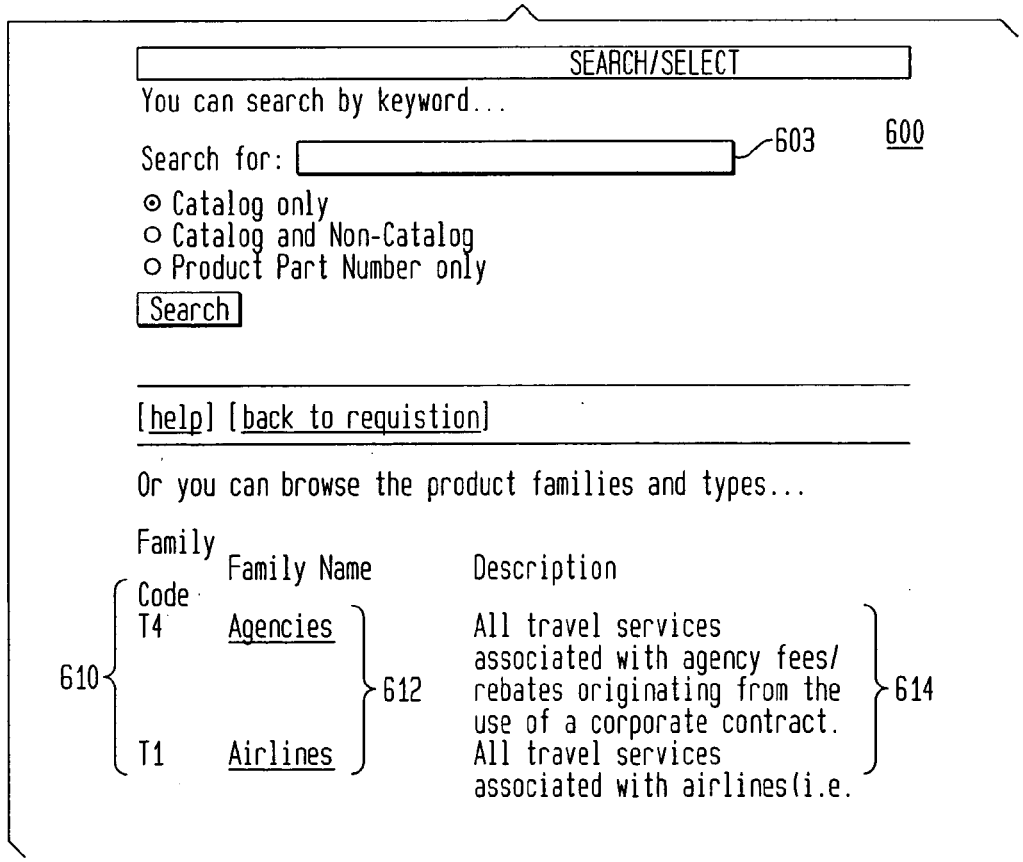
FIG. 6 illustrates a web-based communication presenting choices for a selected "Search/Select" shopping method.

If the user selects the first "Search/Select" option 593, the "Search/Select" screen 600 depicted in FIG. 6 is displayed which comprises the Keyword entry field 603 and radio buttons for selecting Catalog, Catalog and Non-Catalog and, Product Part Number only. The user is additionally enabled to browse product families and types via screen 600 which indicates product Family code fields 610, commodity name 612 ("Airlines," for example) and corresponding descriptions 614. From the screen 600, the user may refine his/her search or select from one of the commodity codes listed; and, the search results may find either catalog, non-catalog, or both. The user may select a commodity from the results list by clicking on the commodity name (Airlines, for example) or select items from the catalog and specify the quantity desired. The page format presented to the user depends on where the commodity is found and how the commodity is classified by the application: Full Buyer Item, Preferred Supplier item or Catalog.

Preferably, once the user is associated with his/her profile, that user is restricted to what he can see and buy. As depicted in FIG. 2, Catalogs 240 comprise the majority of transactions, (e.g., 80%) and they are "buyerless" (less human intervention from Purchasing) so the system ensures that users are directed to the correct catalogs. Preferably, according to the invention, everything that the user can buy is classified into "commodities" (e.g., furniture, office supplies, administrative services, computer equipment, etc.) and these may be further subdivided into subcommodities (office supplies has binders, writing tools, etc.). For each subcommodity, catalogs from various suppliers may be associated. As mentioned, specific plants may be associated with certain catalogs by commodity. For example, commodities may be restricted by company which would prevent any employee from buying an expensive computer from that company, however, only enable those employees who are "reselling" the equipment to purchase it in accordance with their profile.

The user has the additional ability to browse individual catalogs 596 and contracts 599 (FIG. 5) that he/she has access to in accordance with his/her User Profile. As an example of ordering through a contract 599, the Requisition generation step will first include steps such as searching for contract profiles included within the database system, and determining if the user belongs to a department that is authorized for requisition purchase according to the particular contract. If the user is so authorized, a web-page display will indicate the contract items available for user selection which the user may select and add to his/her "buy list" for requisition generation.

It should be understood that the user is not limited to shopping just from catalogs; he/she may fill out a form (not shown) that describes what he/she wants to buy for a given commodity code, and have that routed to the default preferred supplier for that commodity code. Depending upon the purchasing method, the user may have to input specific fields based upon what he/she is buying (for example, business cards or administrative services). If the user still cannot find what he/she is looking for, a Request for Quote (RFQ) may be generated to have a Buyer assist in the location of the item, e.g., through a preferred supplier.

Once the user has added all of the items to the Requisition, the user may click on the "Proceed to Accounting" button. Once the required accounting information is filled out, the user may submit the requisition for approvals. The user may save the requisition at any time as a draft, to be completed later, or as a template, which can be used to create multiple requisitions.

It should be understood that, the Requisition web screen described herein with respect to FIGS. 3 and 4, is the result of dynamically generated "HTML/javascript" code produced by a "displayReqHeader( )" function which dynamically "writes" html and javascript code into the content frame 550 of the Req/Cat application. The javascript function is coded in the displayreq.js file stored on a filesystem (not shown) and loaded into the frame by a source script command in the jscode.html file at the time when the initial frameset is loading. The "displayReqHeader( )" function is called from numerous places in the application to redisplay the requisition information in the content frame.

Referring back to FIG. 2, both the ASAP/BSAP process 280 begins with an approved requisition being input to the SAP system, in the manner as herein described, through the firewall 275. The requisition can be created for the ASAP process or, an existing requisition can be altered by a buyer for the ASAP process. The requisition creation subprocess (i.e., an "Inbound Bridge") is characterized as follows: When a requisition is passed to SAP and the designated purchasing group ID is an ASAP coordinator and the vendor is specified, certain ASAP specific processing takes place. Specific text areas on the requisition form are populated with values passed from the requisition system. Additionally, if the requisition has an SAP contract specified and the vendor on the requisition is not that on the SAP contracts, the vendor from the SAP contract overrides that on the requisition. The ASAP/BSAP Requisition Evaluation subprocess involves evaluating created or modified Requisitions which have occurred since the last execution of the Requisition Evaluation code against ASAP criteria (not shown). If the requisition item successfully passes the ASAP/BSAP audits it will be interfaced to the Purchase Order (PO) Create and Output code. If the requisition item is disqualified from ASAP/BSAP then it will be reassigned to a valid Buyer 260 for PO create and output. Particularly, the Requisition Reassigns and PO Creates from the Requisition Evaluation sub-process are posted to the ASAP/BSAP application. At periodic intervals the ASAP/BSAP Purchase Orders are electronically output, e.g., via e-mail, telephony or Web-based communications 290 to their respective suppliers/vendors 299. Similarly, the ASAP/BSAP process may electronically receive PO confirmations and acknowledgment communications 290.

For the ASAP, when requisition alterations are passed from a feeder system and the original requisition document on SAP was processed using the ASAP PO create, the alteration is applied to the associated PO and the PO is placed to the vendor without buyer intervention if no goods receipt or invoice has been processed. When goods receipts or invoices have been processed the requisition alteration is posted as an AL document and left for manual processing by the ASAP coordinator.

For both ASAP/BSAP requests, when the vendor proposes changes to a purchase order and the changes are within ASAP processing tolerances, the order acknowledgment is married to the purchase order and placed to the vendor without buyer intervention. For vendor acknowledgments to BSAP orders the updating of the purchase order is handled manually by the buyer.

To accomplish the forgoing ASAP/BSAP processes, the following tables need to be maintained: 1) a table for setting the parameters, options and controls for ASAP/BSAP vendors (hereinafter referred to as ZASPV). 2) a table for setting controls at the SAP purchasing organizational level (hereinafter referred to as ZASPP); 3) a table for setting controls at the materials group level (hereinafter referred to as ZASPC); 4) a table for setting controls at the material number level (hereinafter referred to as ZASPM); 5) a table for identifying plant/vendor combinations that should always be non-receivables (hereinafter referred to as ZASPR); and, 6) a table for linking materials groups to purchasing groups by plant (hereinafter referred to as ZASPB).

Figure 7:
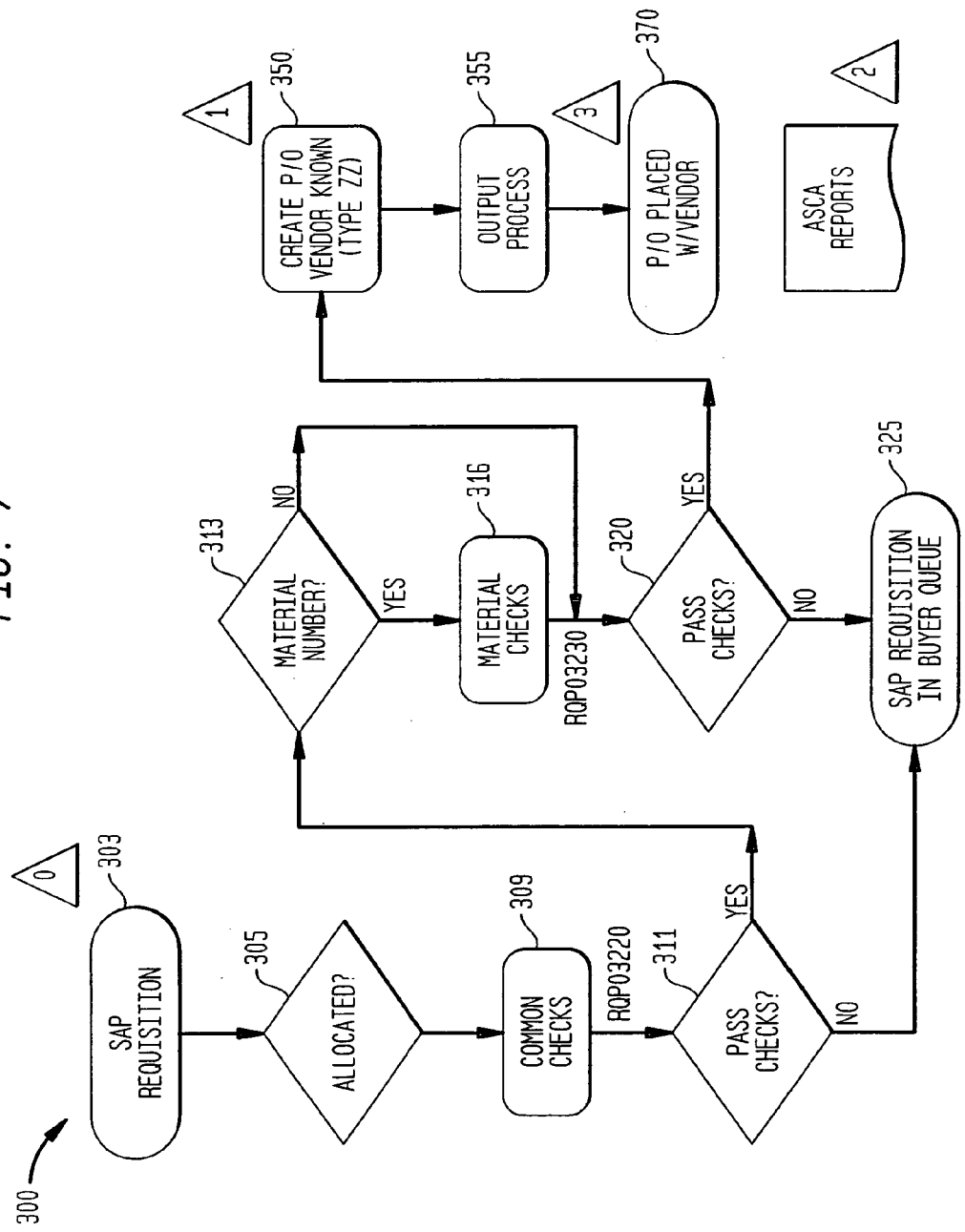
FIG. 7 is a high-level process flow diagram illustrating the enhanced ASAP process according to the present invention.

FIG. 7 is a high-level process flow diagram illustrating the ASAP process 300. As shown at step 302, there is illustrated the above-described SAP requisition creation step and a subsequent determination at step 305 as to whether a vendor has been assigned to the requisition, that the Requisition has been "allocated." Then, at step 309, a common checks procedure is performed, the details of which are described herein with respect to FIG. 8.

Figure 8:
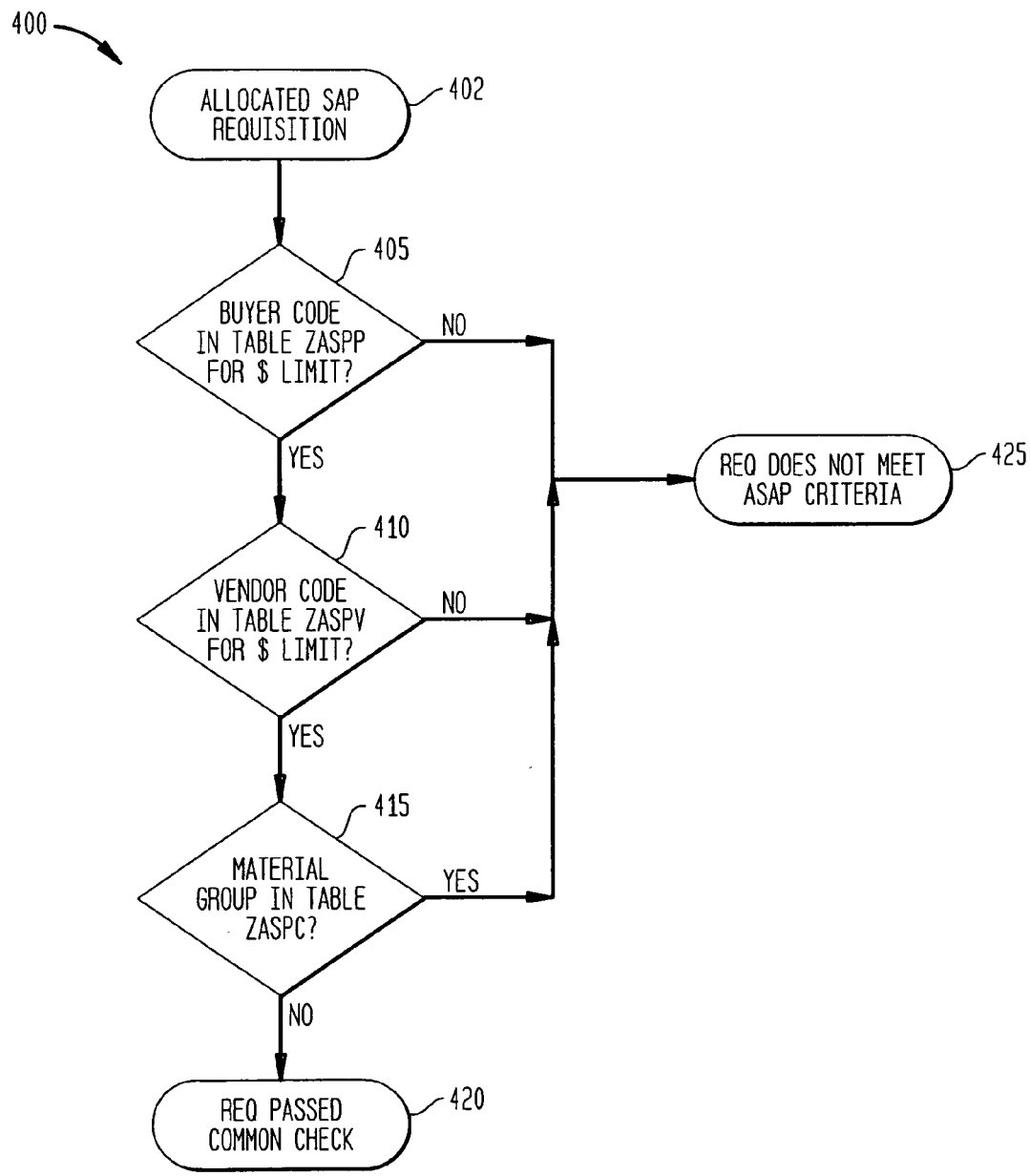
FIG. 8 is a high-level process flow diagram illustrating the ASAP/BSAP Common Check Flow according to the present invention.

Particularly, FIG. 8 is a high-level process flow diagram illustrating the ASAP/BSAP Common Check Flow 400 which invokes subprocesses for evaluating the requisitions (creates and alters) against ASAP criteria. Particularly, as shown in FIG. 8, at step 402, the procedure receives the authorized SAP Requisition and, at step 405, using the authorized userID number as a key, performs a check against the ZASPP table, to ensure that the dollar limit of the purchased goods is within the specified limit for the particular buyer code specified in the requisition. At step 410, a further check is performed against the ZASPV table to ensure that the dollar limit of the purchased goods is within the specified limit for the particular vendor code specified in the requisition. At step 415, a further check is performed against the ZASPC table to ensure that the material group specified in the requisition is provided. If all of these criteria have been met, then the requisition has passed the common checks sub-process, as indicated at step 420. Otherwise, the requisition does not meet the ASAP criteria as indicated at step 425 and the Requisition is placed in the Buyer queue for Buyer processing.

Returning to FIG. 7, a decision is then made at step 311 as to whether the initial checks performed during the requisition evaluation subprocess pass. If the initial checks do not pass, then the process proceeds to step 325, where the SAP procurement engine places the requisition in a Buyer queue which is an electronic "in-box" enabling subsequent Buyer intervention according to the prior art. If all of the common check criteria have been met, then the process proceeds to step 313 where a determination of is made as to whether the requisition included a production part (material) number. If the requisition includes a material number, then at step 316, a material checks procedure is performed, the details of which are described herein with respect to FIG. 9. If the requisition did not include a material number, then the process proceeds to step 320.

Figure 9:
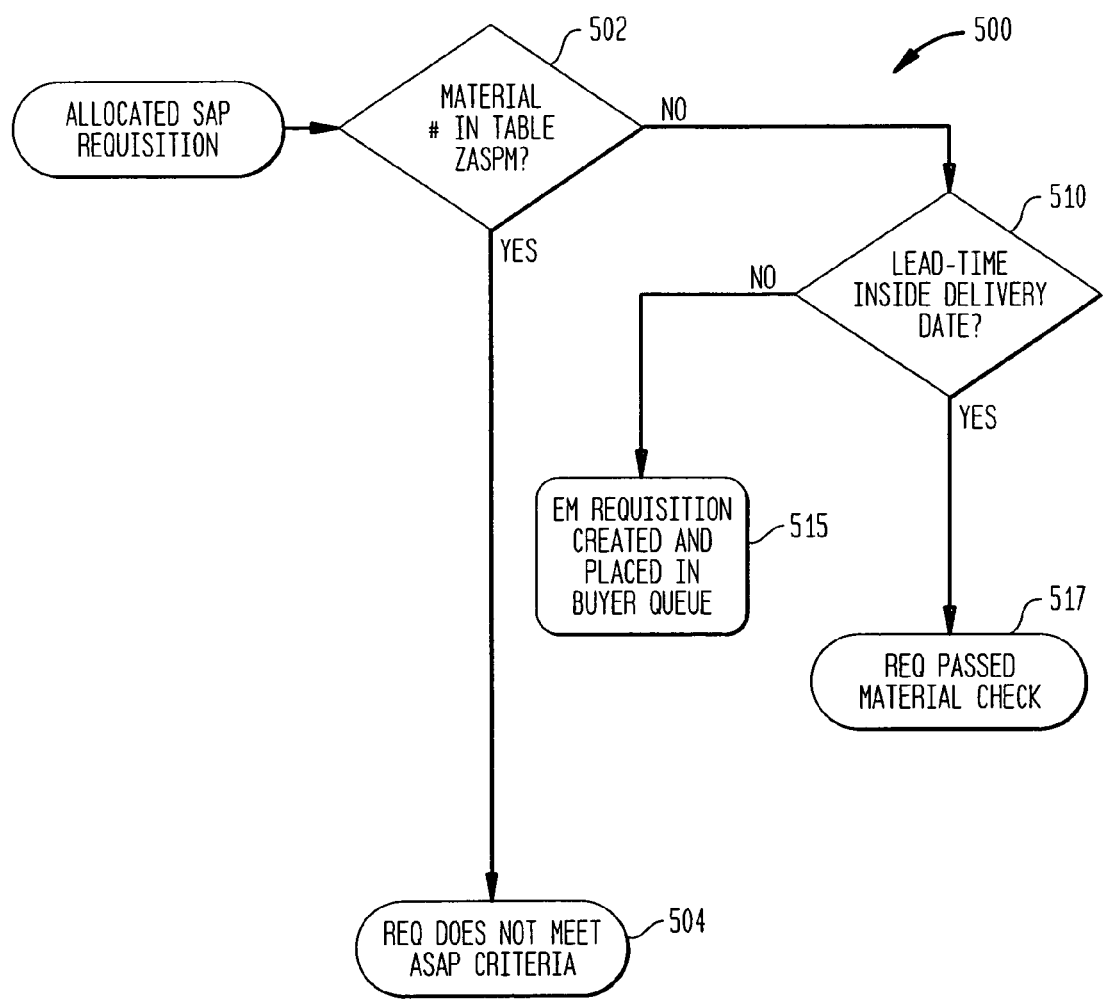
FIG. 9 is a high-level process flow diagram illustrating the Material Check subprocess for evaluating the status of the commodities/products requested.

Particularly, FIG. 9 is a high-level process flow diagram illustrating the ASAP Material Check Flow 500 which invokes subprocesses for evaluating the status of the commodities/products requested. For instance, as shown in FIG. 9, step 502, a first step performs a check against the ZASPM table, to ensure that the material number requiring Buyer intervention is not listed. If the material number is listed, then the requisition does not meet the ASAP criteria as indicated at step 504. Otherwise, if the material number is not listed in the ZASPM table, then a decision is made at step 510 as to whether the lead-time is inside the delivery date expiration. If the lead-time is not within the delivery date limit, then the requisition is modified for placement in the Buyer queue as indicated at step 515. However, if the lead-time is within the delivery date limit, then the Requisition has passed the materials check and the process returns as indicated at step 517.

Returning to FIG. 7, whether or not the Requisition included a production part number, at step 320 a decision is made as to whether the material check flow subprocess passed. If the material check flow subprocess did not pass, then Requisition is placed in the Buyer queue for Buyer processing as indicated at step 325. However, if the material check passed or the production part number was not listed, then the process proceeds to step 350 where a purchase order (PO) is generated by the ASAP process for the allocated vendor. Particularly, the ASAP PO generation process utilizes a specially created document type for processing the ASAP requisitions into purchase orders that are characterized as having bypassed the Buyer. Finally, at step 355 an output process is performed which enables the release and transmission of the generated Purchase Order document from the ASAP application to the vendor. In the preferred embodiment, the ASAP application implements an electronic data interchange (EDI) transmission mechanism, e.g., in accordance with the ANSIX12 850 transmission standard. Finally, as indicated at step 370, the PO is placed with the vendor. At this point, the vendor/supplier will confirm receipt of the Purchase Order by accepting the order outright or, accepting the order subject to changes, e.g., commodity price, delivery date, etc. The vendor then transmits the PO confirmation back to the ASAP process via an EDI transmission mechanism e.g., in accordance with the ANSIX12 855 transmission standard.

Figure 10:
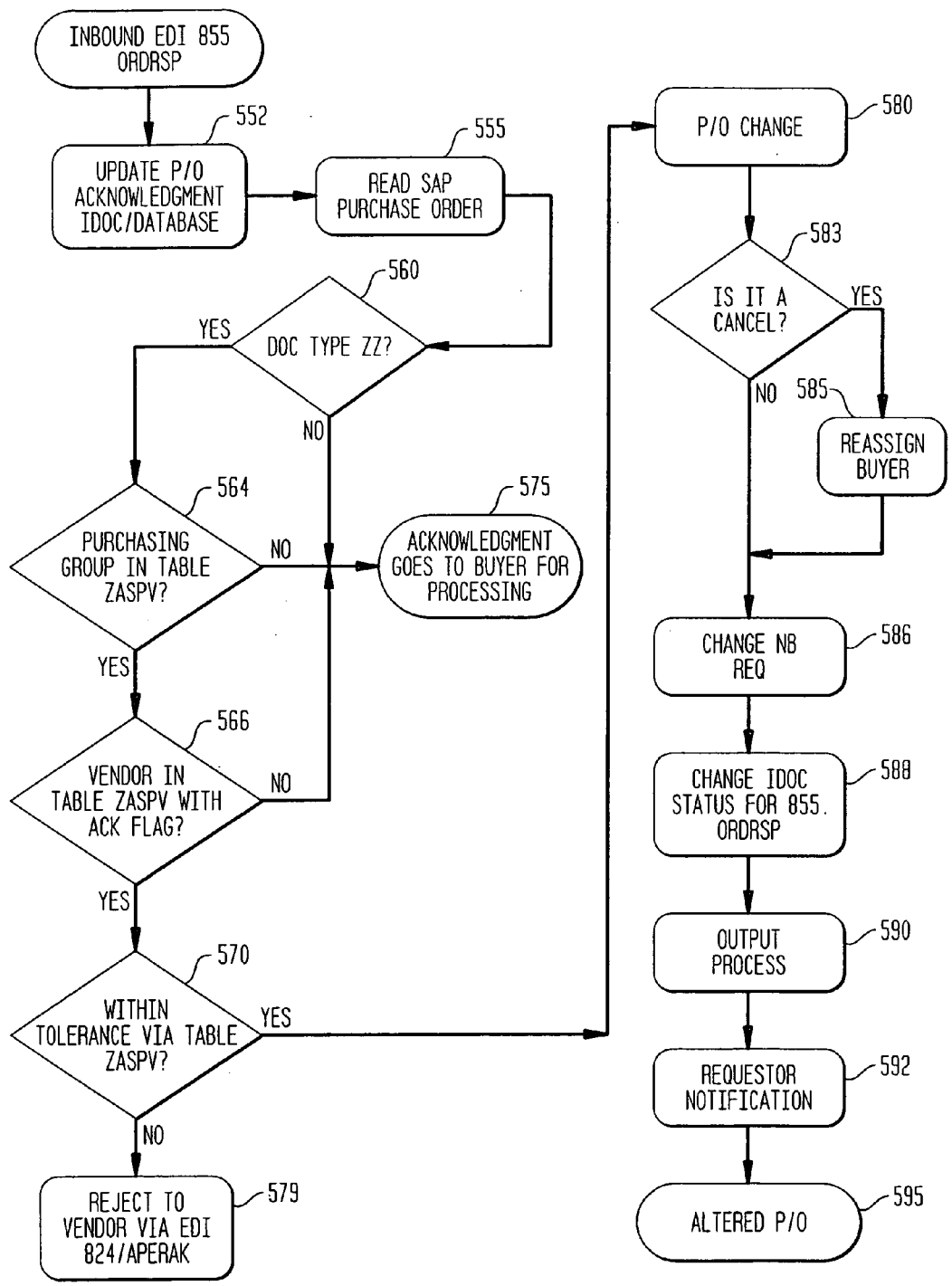
FIG. 10 illustrates the ASAP Order Acknowledgment process according to the invention.

FIG. 10 illustrates the ASAP Order Acknowledgment process 550 which is invoked by the ASAP process after it has received the ANSIX12 855 PO confirmation from the vendor. While a PO may be immediately accepted without any changes, the scenario described with respect to FIG. 10 is directed to the case where the PO is accepted with vendor indicated changes to purchase price and/or delivery date. Specifically, as illustrated at step 552, a PO acknowledgment update is first performed via an intermediate document SAP database (not shown) which has received the vendor's ANSIX12 855 PO confirmation. Then, at step 555, the ASAP process reads the PO confirmation and makes a series of decisions regarding the PO confirmation content: 1) whether the confirmation has an identifier (form (ZZ)) which characterizes the PO as having originated via the ASAP/BSAP process and having bypassed the Buyer at step 560; 2) whether the Purchasing Group (department) associated with the purchased commodity indicated in the confirmation is authorized according to ASAP/BSAP vendor options and controls table (table ZASPV) at step 564; and, 3) whether the vendor is an approved ASAP Vendor enabled to send PO Acknowledgments (w/changes), i.e., has an associated ACK flag set in table ZASPV at step 566. If any of the conditions are not met in steps 560, 564 and 566, then the PO Acknowledgment goes to the Buyer Queue for further processing by the Buyer at step 575. If the conditions are met in steps 560, 564 and 566, a further determination is made at step 570 as to the whether the commodity purchase price and delivery date for the commodity has been changed by the vendor within the respective tolerances (e.g., percent or net dollar amount change) as specified in the table ZASPV. If the commodity purchase price and delivery date changes are not within tolerance, then the PO acknowledgment is rejected via an EDI transmission back to the vendor, e.g., via an ANSIX12 824 protocol, as indicated at step 579. Although not shown, a notification is additionally sent to the Buyer for resolution of the PO changes. If however, the commodity purchase price and delivery date changes are within tolerance, then this is indicated as a PO change as shown at step 580 and a determination is made at step 583 as to whether the PO acknowledgment includes a cancellation notice, e.g., for the case when the vendor no longer carries the requested product for example. If a change is a cancel, then the corresponding Requisition is reassigned to a Buyer at step 585, who will look for another vendor who may carry the product. Otherwise, the changes are updated to the corresponding originating Requisition document at step 586, and the PO status is indicated as accepted in the intermediate document SAP database (not shown) at step 588. Finally, an output process is performed at step 590 for initiating the generation of an accepted "altered" PO which is subsequently sent to the Vendor at step 595. An additional notification of the altered PO including the modified PO terms is sent to the Requestor as indicated at step 592.

Figure 11:
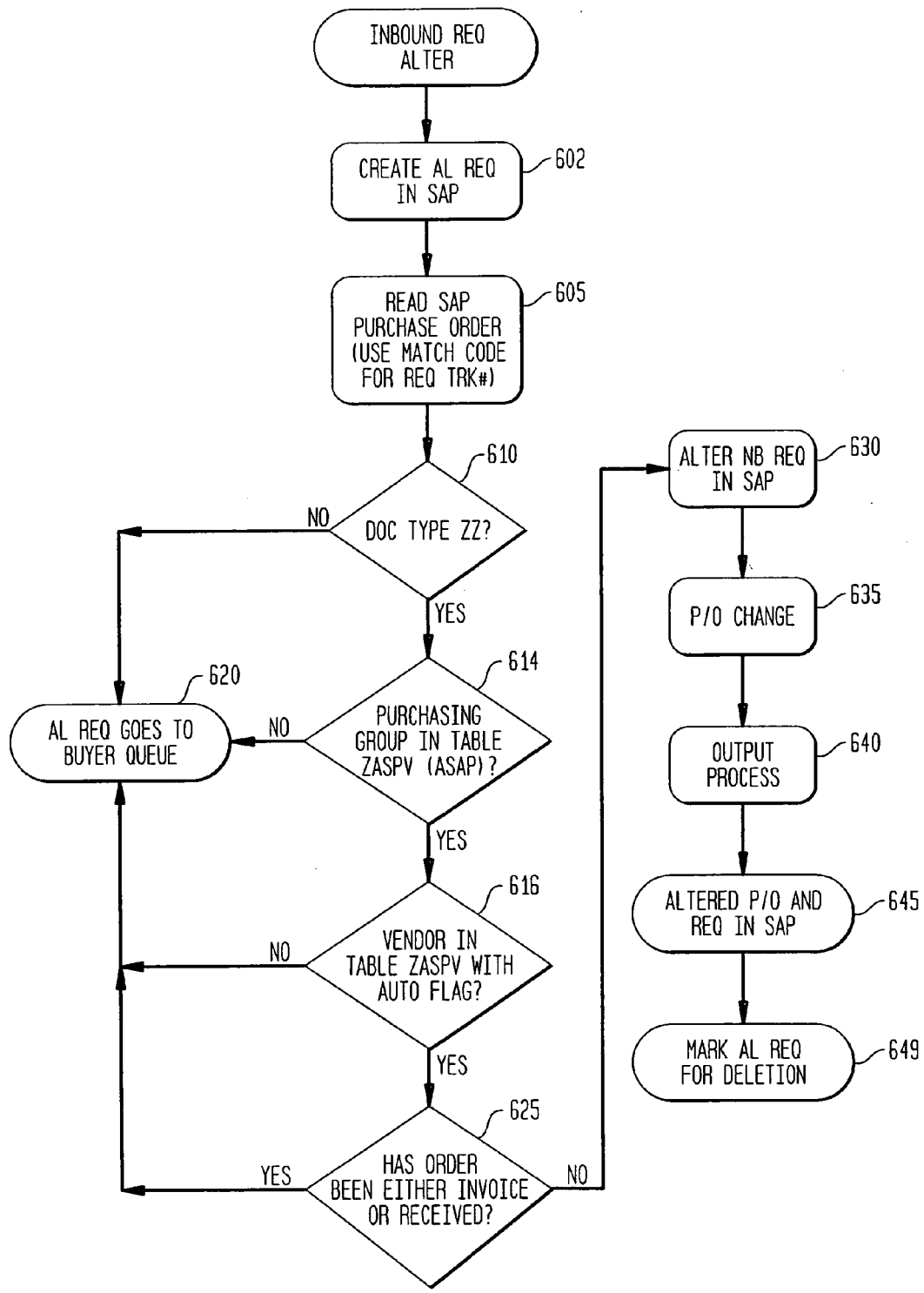
FIG. 11 is a high-level flow chart depicting the ASAP Requisition Alteration/cancellation process.

As briefly mentioned above, the Requestor is enabled to initiate alteration of an existing PO, for example, when a Requestor needs to order 20 pencils instead of 10 pencils. FIG. 11 is a high-level flow chart depicting the ASAP Requisition Alteration/cancellation process 600. As shown in FIG. 11, a first step 602 depicts the creation of the alteration in the Requisition created for SAP which involves the generation of an alteration Requisition for input to the SAP system. Then, at step 605 a link is established to the original PO in the SAP system corresponding to the Requisition to be altered. Then, at step 610, the following checks are performed relating to the alteration requisition content: 1) whether the alteration Req has an identifier (form (ZZ)) which characterizes the PO as having originated via the ASAP/BSAP process and having bypassed the Buyer at step 610; 2) whether the Purchasing Group (department) associated with the purchased commodity indicated in the alteration is authorized according to ASAP/BSAP vendor options and controls table at step 614; and, 3) whether the vendor is an approved ASAP Vendor enabled to send PO Acknowledgments (w/changes), i.e., has an associated ACK flag set in table ZASPV at step 616. If any of the conditions are not met in steps 610, 614 and 616, then the Alteration Requisition goes to the Buyer Queue for further processing by the Buyer at step 620. If the conditions are met in steps 610, 614 and 616, a further determination is made at step 625 as to the whether an invoice corresponding to the linked PO has been received. If an invoice corresponding to the linked PO has been received, the Alteration Requisition goes to the Buyer Queue for further processing by the Buyer at step 620. If an invoice corresponding to the linked PO has not yet been received, then the existing Requisition in the SAP is changed at step 630, the corresponding PO is changed at step 635 and an output process is initiated for generating and transmitting the altered PO to the vendor at step 640. Once the altered PO and corresponding Requisition is present in the SAP as indicated at step 645, the original Alteration Requisition is marked for deletion at step 649.

Figure 12:
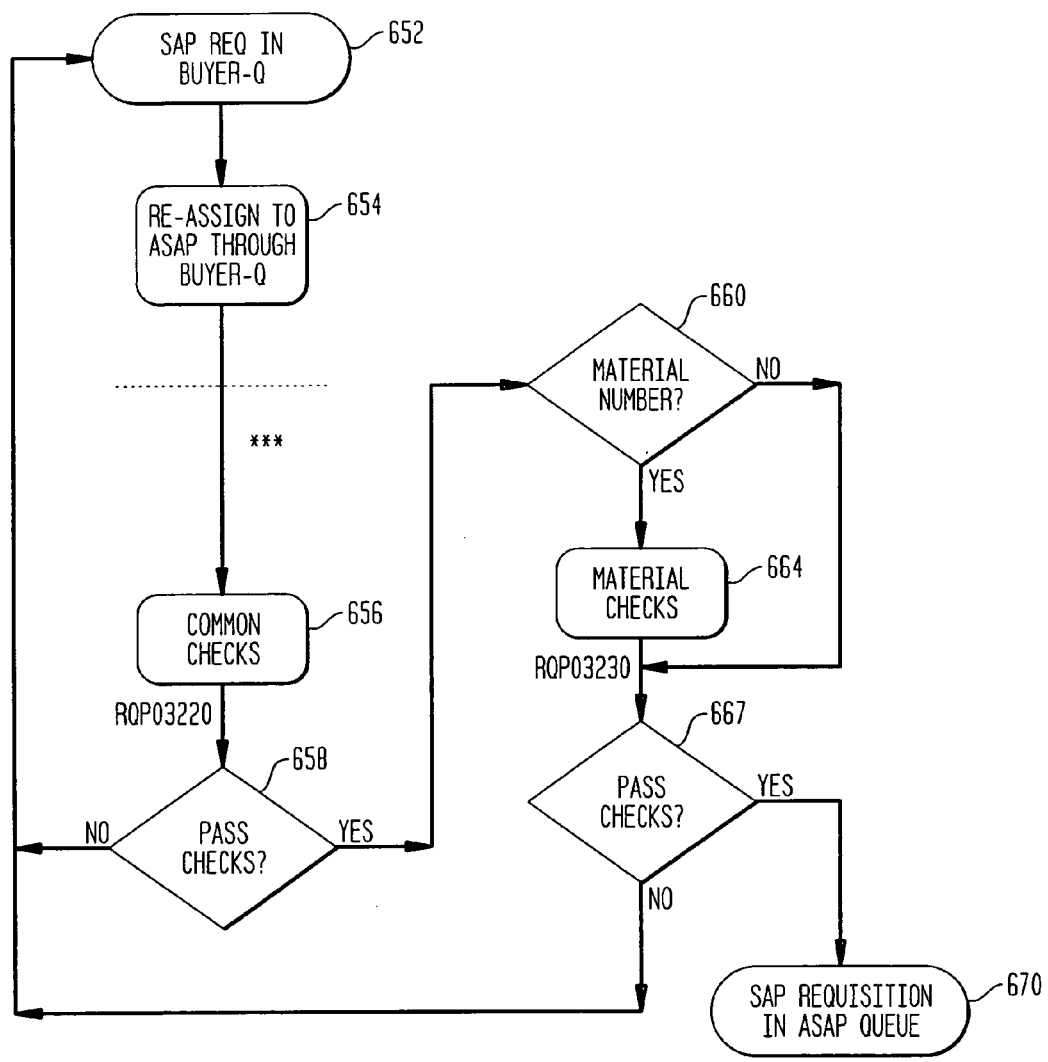
FIG. 12 illustrates the process for transferring a Requisition from the Buyer to the ASAP process.

It is understood that when an ASAP Req or ASAP PO has been forwarded to the Buyer Queue as illustrated in FIGS. 7, 10 and 11, the Buyer subsequently handles the procurement process. The Buyer however, may recognize that the ASAP processing criteria may be incorrect. For instance, it may be discovered that the parameters and limits set forth in the ZASPV or ZASPM tables may not have been updated correctly or were set to erroneous values. Thus, the Buyer will have an opportunity to re-assign the Requisition or PO to the ASAP process via the Buyer queue. FIG. 12 illustrates the process 650 for transferring a Requisition from the Buyer to the ASAP process. Particularly, at step 652, the SAP Req is shown indicated in the Buyer queue. At step 654, the Buyer may re-assign the Requisition or PO to the ASAP process. It is understood that this re-assignment function may take place when an outbound trigger runs, e.g., automatically every X minutes as the Requisition feed to the SAP application is invoked as a batch job schedule. Then, at step 656, the common checks procedure is performed as described herein with respect to FIG. 8. Next, at step 658, a decision is made as to whether the common ASAP checks performed have passed. If these checks do not pass, then the process proceeds to step 652, where the Requisition is again placed in the Buyer Queue. If all of the common check criteria have been met, then the process proceeds to step 660 where a determination of is made as to whether the requisition included a production part (material) number. If the requisition included a material number, then at step 664, a material checks procedure is performed, the details of which are described herein with respect to FIG. 9. If the requisition did not include a material number, then the process proceeds to step 667. Whether or not the Requisition included a production part number, at step 667 a decision is made as to whether the material check flow sub-process passed. If the material check flow sub-process did not pass, then Requisition is placed in the Buyer queue as indicated at step 652. However, if the material check passed or the production part number was not listed, then the process proceeds to step 670 where the requisition will be transferred to the ASAP purchasing group.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A web-based product procurement system for an enterprise, comprising:
    database storage means for storing electronic catalogs comprising vendor products purchasable by a user having an associated user profile;
    a computer providing a GUI from which the user chooses one of a plurality of shopping methods including: (a) at least one of searching by keyword and selecting a product family, (b) browsing the electronic catalogs, and (c) ordering from a contract;
    means for providing a catalog purchase from at least one of the electronic catalogs when: (i) the user chooses the shopping method (a), searches by keyword, and the keyword is associated with the at least one of the electronic catalogs, (ii) the user chooses the shopping method (a), selects a product family, and a commodity selected thereby is associated with the at least one of the electronic catalogs, and (iii) the user chooses the shopping method (b);
    means for providing a preferred supplier purchase the user chooses at least one of shopping methods (a) and (b), and a commodity selected thereby is classified as a preferred supplier item; and
    means for providing a contract purchase when the user chooses shopping method (c).

2. The web-based system as claimed in claim 1, wherein said electronic catalogs include commodities having associated commodity codes, said system including means for linking the user to specific commodity codes via the user's profile.

3. The web-based system as claimed in claim 1, further comprising:
    means for automatically generating a requisition for said user indicating a desired product and product quantity for a product indicated in said electronic catalog.

4. The web-based system as claimed in claim 3, further comprising:
    means for verifying requisition information prior to purchase order generation, including table look-up means for comparing products indicated in said requisition with types of materials allowable to be ordered without buyer intervention.

5. The web-based system as claimed in claim 4, wherein said means for verifying further includes table look-up means for comparing a purchase amount for commodities indicated in said requisition with a total allowable purchase amount for commodities indicated.

6. The web-based system as claimed in claim 4, wherein said means for verifying further includes look-up means for verifying whether a vendor indicated to provide a requested commodity is entitled to process a purchase order without buyer intervention.

7. The web-based system as claimed in claim 3, wherein:
    said means for automatically generating a requisition is responsive to said user profile for restricting access to said electronic catalogs, and providing user selection of product and product quantities.

8. The web-based system as claimed in claim 3, further comprising:
means for receiving the generated requisition and automatically generating a purchase order therefrom; and
means for forwarding said purchase order to a vendor without intervention by a buyer.

9. The web-based system as claimed in claim 8, wherein said vendor changes terms of said purchase order prior to accepting said purchase order, said system further including:
means for checking whether the changed terms are within a pre-determined specification.

10. The web-based system as claimed in claim 9, wherein said checking means includes table look-up means for determining whether terms changed by said vendor in said purchase order are acceptable and automatically communicating said acceptability back to said vendor without buyer intervention.

11. The web-based system as claimed in claim 1, wherein:
a full buyer purchase is provided when the user chooses at least one of shopping methods (a) and (b), and a commodity selected thereby is classified as a full buyer item.

12. A method for use by employees of an enterprise for procuring commodities, comprising the steps of:
associating an employee with a user profile comprising information relating a status of said employee within said enterprise;
providing user access to one or more electronic catalogs for requesting a commodity, wherein specific commodities in electronic catalogs are allocated for user purchase access based on said user profile information;
providing a GUI from which the employee chooses one of a plurality of shopping methods including: (a) at least one of searching by keyword and selecting a product family, (b) browsing the electronic catalogs, and (c) ordering from a contract;
providing a catalog purchase from at least one of the electronic catalogs when: (i) the user chooses the shopping method (a), searches by keyword, and the keyword is associated with the at least one of the electronic catalogs, (ii) the user chooses the shopping method (a), selects a product family, and a commodity selected thereby is associated with the at least one of the electronic catalogs, and (iii) the user chooses the shopping method (b);
providing a preferred supplier purchase when the user chooses at least one of shopping methods (a) and (b), and a commodity selected thereby is classified as a preferred supplier item; and
providing a contract purchase when the user chooses shopping method (c).

13. The method as claimed in claim 12, wherein said electronic catalogs include commodities having associated commodity codes, said method further including the step of linking the user to specific commodity codes via the user's profile information.

14. The method as claimed in claim 12, further including the step of verifying requisition information prior to purchase order generation.

15. The method as claimed in claim 14, wherein said verifying step includes comparing commodities indicated in said requisition with types of materials determined to be allowable for employee order without buyer intervention.

16. The method as claimed in claim 14, wherein said verifying step includes comparing purchase amount for commodities indicated in said requisition with a total allowable purchase amount for commodities indicated.

17. The method as claimed in claim 14, wherein said verifying step further includes verifying whether a vendor indicated to provide said requested commodity is entitled to process a purchase order without buyer intervention.

18. The method as claimed in claim 14, further including the step of transmitting said generated purchase order to said vendor for approval thereof.

19. The method as claimed in claim 18, wherein said vendor changes terms of said purchase order prior to accepting said purchase order, said method further including the step of transmitting said purchase order with changes in a purchase order acknowledgment.

20. The method as claimed in claim 19, further including a checking step for determining whether terms changed by said vendor in said purchase order acknowledgment are within a pre-determined specification and automatically communicating said acceptability back to said vendor without buyer intervention.

21. The method of claim 14, further comprising:
receiving a generated requisition and automatically generating a purchase order therefrom; and
forwarding said purchase order to a vendor without intervention by a buyer.

22. The method of claim 12, further comprising:
automatically generating a requisition for said user indicating a desired commodity and commodity quantity for a commodity indicated in said electronic catalog.

23. The method of claim 12, further comprising:
restricting access to said electronic catalogs responsive to said user profile, and providing user selection of commodity and commodity quantities responsive to said user profile.

24. The method of claim 12, further comprising:
providing a full buyer purchase when the user chooses at least one of shopping methods (a) and (b), and a commodity selected thereby is classified as a full buyer item.

25. A program storage device readable by a machine, tangibly embodying a program of instructions executable by the machine to perform method steps for procuring commodities for use by employees of an enterprise, said method steps comprising:
associating an employee with a user profile comprising information relating a status of said employee within said enterprise;
providing user access to one or more electronic catalogs for requesting a commodity, wherein specific commodities in electronic catalogs are allocated for user purchase access based on said user profile information;
providing a GUI from which the employee chooses one of a plurality of shopping methods including: (a) at least one of searching by keyword and selecting a product family, (b) browsing the electronic catalogs, and (c) ordering from a contract;
providing a catalog purchase from at least one of the electronic catalogs when: (i) the user chooses the shopping method (a), searches by keyword, and the keyword is associated with the at least one of the electronic catalogs, (ii) the user chooses the shopping method (a), selects a product family, and a commodity selected thereby is associated with the at least one of the electronic catalogs, and (iii) the user chooses the shopping method (b);
providing a preferred supplier purchase when the user chooses at least one of shopping methods (a) and (b), and a commodity selected thereby is classified as a preferred supplier item; and providing a contract purchase when the user chooses shopping method (c).

26. The program storage device of claim 25, wherein the method steps further comprise:

providing a full buyer purchase when the user chooses at least one of shopping methods (a) and (b), and a commodity selected thereby is classified as a full buyer item.

* * * * *